(12) United States Patent
Seo et al.

(10) Patent No.: US 8,660,601 B2
(45) Date of Patent: Feb. 25, 2014

(54) COMMUNICATION SYSTEM INCLUDING BASE STATIONS AND TERMINAL FOR MULTI-CELL COOPERATIVE COMMUNICATION

(75) Inventors: Bangwon Seo, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 198 days.

(21) Appl. No.: 13/059,903

(22) PCT Filed: Aug. 14, 2009

(86) PCT No.: PCT/KR2009/004548
§ 371 (c)(1),
(2), (4) Date: Feb. 18, 2011

(87) PCT Pub. No.: WO2010/021471
PCT Pub. Date: Feb. 25, 2010

(65) Prior Publication Data
US 2011/0151918 A1 Jun. 23, 2011

(30) Foreign Application Priority Data

Aug. 18, 2008 (KR) .................. 10-2008-0080454
Sep. 24, 2008 (KR) .................. 10-2008-0093586
Jul. 9, 2009 (KR) .................. 10-2009-0062450

(51) Int. Cl.
*H04B 7/00* (2006.01)
*H04B 1/00* (2006.01)

(52) U.S. Cl.
USPC .................. 455/522; 455/69; 455/127.1

(58) Field of Classification Search
CPC .................................................. H04B 7/0671
USPC .................. 455/501, 101, 69, 522
See application file for complete search history.

(56) References Cited

U.S. PATENT DOCUMENTS 7,356,090 B2 * 4/2008 Hwang et al. ............. 375/295
7,881,395 B2 * 2/2011 Lee et al. ................. 375/267
(Continued)

FOREIGN PATENT DOCUMENTS

KR 1020050048344 5/2005
KR 10-2007-0113967 11/2007
(Continued)

OTHER PUBLICATIONS

Motorola, "LTE-A Multiple Point Coordination and its Classification," TSG-RAN WG1 #54, R1-083229, 7 pages, (2008).

(Continued)

*Primary Examiner* — Tilahun B Gesesse
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a communication system for a multi-cell cooperative communication. A serving base station and at least one neighboring base station may communicate with at least one terminal through mutual cooperation. Each of the serving base station and the at least one neighboring base station may shift a phase of at least one element among elements included in a precoding matrix, using a phase shift matrix, and precode at least one data symbol. A terminal may feed back preferred phase shift matrix information to the serving base station, so that the serving base station and the at least one neighboring base station may adaptively determine a phase shift matrix. The terminal may calculate the phase shift matrix with small calculation amounts. The serving base station, the at least one neighboring base station, and the terminal may pre-store a plurality of candidate matrices with respect to the phase shift matrix.

18 Claims, 8 Drawing Sheets

(56) References Cited

U.S. PATENT DOCUMENTS

| | | | |
|---|---|---|---|
| 7,953,176 B2* | 5/2011 | Roh | 375/295 |
| 8,000,401 B2* | 8/2011 | Lee et al. | 375/260 |
| 8,036,286 B2* | 10/2011 | Lee et al. | 375/260 |
| 8,068,555 B2* | 11/2011 | Jongren et al. | 375/295 |
| 8,126,487 B2* | 2/2012 | Lee et al. | 455/501 |
| 8,131,228 B2* | 3/2012 | Liao et al. | 455/101 |
| 8,135,085 B2* | 3/2012 | Lee et al. | 375/267 |
| 8,175,182 B2* | 5/2012 | Lee et al. | 375/267 |
| 8,199,853 B2* | 6/2012 | Kim et al. | 375/299 |
| 8,213,530 B2* | 7/2012 | Lee et al. | 375/267 |
| 8,213,870 B2* | 7/2012 | Zhang et al. | 455/63.4 |
| 8,238,471 B2* | 8/2012 | Hwang et al. | 375/296 |
| 8,275,063 B2* | 9/2012 | Kim et al. | 375/267 |
| 8,284,849 B2* | 10/2012 | Lee et al. | 375/260 |
| 8,331,464 B2* | 12/2012 | Lee et al. | 375/260 |
| 8,351,535 B2* | 1/2013 | Kim et al. | 375/267 |
| 8,358,718 B2* | 1/2013 | Lee et al. | 375/295 |
| 2008/0080637 A1* | 4/2008 | Khan et al. | 375/267 |
| 2009/0036150 A1* | 2/2009 | Liao et al. | 455/501 |
| 2009/0197546 A1* | 8/2009 | Kim et al. | 455/101 |
| 2010/0173660 A1* | 7/2010 | Liu et al. | 455/501 |
| 2010/0317382 A1* | 12/2010 | Lee et al. | 455/501 |
| 2011/0151918 A1* | 6/2011 | Seo et al. | 455/522 |
| 2011/0159866 A1* | 6/2011 | Kim et al. | 455/422.1 |
| 2011/0200132 A1* | 8/2011 | Kim et al. | 375/267 |
| 2012/0190309 A1* | 7/2012 | Tang | 455/69 |
| 2012/0282936 A1* | 11/2012 | Gao et al. | 455/450 |
| 2013/0005282 A1* | 1/2013 | Zhang et al. | 455/114.2 |
| 2013/0029680 A1* | 1/2013 | Park et al. | 455/450 |

FOREIGN PATENT DOCUMENTS

| | | |
|---|---|---|
| KR | 10-2008-0026010 | 3/2008 |
| KR | 1020080076745 | 8/2008 |
| WO | 2007/123029 A1 | 11/2007 |
| WO | 2007/139325 A1 | 12/2007 |
| WO | 2008/035915 A2 | 3/2008 |
| WO | 2008/054178 A2 | 5/2008 |

OTHER PUBLICATIONS

Texas Instruments, "Network MIMO Precoding," 3GPP TSG RAN WG1 #53bis, R1-082497, 4 pages (2008).

* cited by examiner

COMMUNICATION SYSTEM INCLUDING BASE STATIONS AND TERMINAL FOR MULTI-CELL COOPERATIVE COMMUNICATION

RELATED APPLICATIONS

This application is a 35 U.S.C. §371 national stage filing of PCT Application No. PCT/KR2009/004548 filed on Aug. 14, 2009, which claims priority to, and the benefit of, Korean Patent Application No. 10-2008-0080454 filed 18 Aug. 2008; Korean Patent Application No. 10-2008-0093586 filed 24 Sep. 2008 and Korean Patent Application No. 10-2009-0062450 filed 9 Jul. 2009. The contents of the aforementioned applications are hereby incorporated by reference.

TECHNICAL FIELD

Embodiments of the present invention relate to a multiple input multiple output (MIMO) communication system, and more particularly, to technologies required for at least two base stations to serve at least one terminal in a multi-cell MIMO communication system.

BACKGROUND ART

Currently, researches are being actively conducted in order to provide various types of multimedia services and to support a high quality and high speed data transmission in a radio communication environment. In particular, a technology associated with a multiple input multiple output (MIMO) communication system using a plurality of channels in a spatial area is in a rapid development. A single-cell MIMO communication system includes a single base station. Generally, the single-cell MIMO communication system may be classified into a single-cell multi-user MIMO communication system including a plurality of users and a single base station, and a single-cell single-user MIMO communication system including a single user and a single base station.

In the single-cell MIMO communication system, at least one base station and terminals may use a codebook. A particular space may be quantized into a plurality of vectors or matrices. The plurality of vectors or matrices may be stored as the codebook in the base station and the terminals. Each of the terminals may select any one vector or matrix from vectors or matrices included in the codebook, based on a channel between the base station and each of the terminals. The base station may also verify the selected vector matrix using the codebook. The selected vector or matrix may be used for the base station to generate a precoding vector or a precoding matrix. A scheme of performing precoding as described above is referred to as a codebook-based precoding scheme.

Also, a research regarding a multi-cell MIMO communication system including a plurality of base stations is being conducted. In the multi-cell MIMO communication system, at least two base stations may serve at least one terminal through a mutual cooperation. Since the at least two base stations cooperate with each other, it is possible to enhance a transmission rate to a terminal, particularly, a terminal that is located in a cell edge.

The codebook-based precoding scheme may be used even in the multi-cell MIMO communication system. A difference between the multi-cell MIMO communication system and the single-cell MIMO communication system lies in that the multi-cell MIMO communication system includes at least two base stations and the single-cell MIMO communication system includes a single base station. Accordingly, when the codebook-based precoding scheme used in the single-cell MIMO communication system is applied to the multi-cell MIMO communication as is, it may cause a problem.

DISCLOSURE OF INVENTION

Technical Problem

An aspect of the present invention provides a base station and a terminal that may shift a phase of at least one element among elements included in a precoding matrix, using a phase shift matrix, to thereby perform precoding optimized for a multi-cell cooperative communication.

Another aspect of the present invention also provides a base station and a terminal that may adaptively use a phase shift matrix to perform a multi-cell cooperative communication achieving an enhanced capacity.

Another aspect of the present invention also provides a base station and a terminal that may more effectively determine a phase shift matrix using a codebook including a plurality of candidate matrices.

Another aspect of the present invention also provides a terminal that may calculate a preferred phase shift matrix with a small calculation amount.

Another aspect of the present invention also provides a base station that may adaptively adjust a power weight.

Solution to Problem

According to an aspect of the present invention, there is provided a method of operating a serving base station for a multi-cell cooperative communication in cooperation with at least one neighboring base station, the method including: generating a precoding matrix based on a plurality of codeword matrices; providing a phase shift matrix to shift a phase of at least one element among elements included in the precoding matrix; and precoding at least one data symbol using the phase shift matrix and the precoding matrix.

In this instance, the method may further include adjusting a transmit power of the precoded at least one data symbol.

Also, the adjusting may include adaptively adjusting the transmit power of the precoded at least one data symbol based on at least one of a channel between the at least one neighboring base station and a terminal, a channel between the serving base station and the terminal, and an achievable capacity of the terminal.

Also, the providing may include adaptively providing the phase shift matrix based on at least one of a channel between the at least one neighboring base station and a terminal, a channel between the serving base station and the terminal, and an achievable capacity of the terminal.

Also, the providing may include generating the phase shift matrix based on an effective channel between the at least one neighboring base station and a terminal or an effective channel between the at least one neighboring base station and the terminal with respect to each of the at least one data symbol.

Also, the providing may include providing the phase shift matrix using a plurality of candidate matrices pre-stored in a memory.

Also, the method may further include receiving, from a terminal, information associated with a preferred phase shift matrix. The providing may include providing the phase shift matrix based on information associated with the preferred phase shift matrix.

Here, information associated with the preferred phase shift matrix may be generated by the terminal based on an achievable capacity of the terminal, or may be generated by the terminal based on an effective channel between the serving base station and the terminal or an effective channel between the at least one neighboring base station and the terminal with respect to each of the at least one data symbol.

Also, the providing may include providing the phase shift matrix in a form of a diagonal matrix.

Also, the providing may include providing the phase shift matrix in order to shift a phase of each of at least one precoding vector included in the precoding matrix, based on a column vector unit.

Also, the method may further include transferring, to the at least one neighboring base station, information associated with the phase shift matrix, information associated with the precoding matrix, or information associated with the transmit power.

According to another aspect of the present invention, there is provided a method of operating a terminal for a multi-cell cooperative communication through a mutual cooperation between at least one neighboring base station and a servicing base station, the method including: driving a memory storing a plurality of candidate matrices; generating information associated with a preferred phase shift matrix among the plurality of candidate matrices, so that the at least one neighboring base station or the serving base station uses a phase shift matrix to shift a phase of at least on element among elements included in a precoding matrix; and feeding back, to the at least one neighboring base station or the serving base station, information associated with the preferred phase shift matrix.

In this instance, the generating may include generating information associated with the preferred phase shift matrix based on an achievable capacity.

Also, the generating may include generating information associated with the preferred phase shift matrix based on an effective channel between the at least one neighboring base station and a terminal or an effective channel between the serving base station and the terminal with respect to each of at least one data symbol that the at least one neighboring base station or the serving base station desires to precode.

Also, the generating may include determining the preferred phase shift matrix after determining at least one of a number of preferred data symbols and the preferred precoding matrix.

Also, the method may further include feeding back information associated with a preferred power weight so that the at least one neighboring base station or the serving base station adjust a transmit power of at least one data symbol.

According to still another aspect of the present invention, there is provided a serving base station for a multi-cell cooperative communication in cooperation with at least one neighboring base station, the serving base station including: a memory to store a plurality of codeword matrices and a plurality of candidate matrices; a precoding matrix generator to generate a precoding matrix based on the plurality of codeword matrices stored in the memory; a phase shift matrix providing unit to provide a phase shift matrix based on the plurality of candidate matrices in order to shift a phase of at least one element among elements included in the precoding matrix; and a precoder to precode at least one data symbol using the phase shift matrix and the precoding matrix.

In this instance, the serving base station may further include: an information receiver to receive, from a terminal, information associated with a preferred phase shift matrix; and a power weight adjustment unit to adjust a power weight based on information associated with a preferred power weight fed back from the terminal, in order to adjust a transmit power of the precoded at least one data symbol. The phase shift matrix providing unit may provide the phase shift matrix based on information associated with the preferred phase shift matrix.

According to yet another aspect of the present invention, there is provided a terminal for a multi-cell cooperative communication performed through a mutual cooperation between at least one neighboring base station and a serving base station, the terminal including: a memory to store a plurality of codeword matrices and a plurality of candidate matrices that are used to feed back information associated with a preferred precoding matrix; an information generator to generate information associated with a preferred phase shift matrix among the plurality of candidate matrices, so that the at least one neighboring base station or the serving base station uses a phase shift matrix to shift a phase of at least one element among elements included in the precoding matrix; and an information feedback unit to feed back, to the at least one neighboring base station or the serving base station, information associated with the preferred phase shift matrix.

In this instance, the information generator may generate information associated with the preferred phase shift matrix based on an achievable capacity, or may generate information associated with the preferred phase shift matrix based on an effective channel between the serving base station and a terminal or an effective channel between the at least one neighboring base station and the terminal with respect to each of at least one data symbol that the at least one neighboring base station or the serving base station desires to precode.

Also, the information generator may include a decision unit to determine the preferred phase shift matrix after determining at least one of a number of preferred data symbols and the preferred precoding matrix.

According to a further another aspect of the present invention, there is provided a method of operating a neighboring base station for a multi-cell cooperative communication in cooperation with a serving base station, the method including: receiving, from the serving base station, information regarding a phase shift matrix and a precoding matrix; and precoding at least one data symbol that the serving base station desires to transmit using the phase shift matrix and the precoding matrix.

In this instance, the method may further include extracting the phase shift matrix from a plurality of candidate matrices pre-stored in a memory, based on information associated with the phase shift matrix.

Here, the phase shift matrix may be in a form of a diagonal matrix.

Also, the method may further include: receiving information associated with a transmit power from the serving base station; and adjusting a transmit power of the precoded at least one data symbol based on information associated with the transmit power.

MODE FOR THE INVENTION

Figure 1:
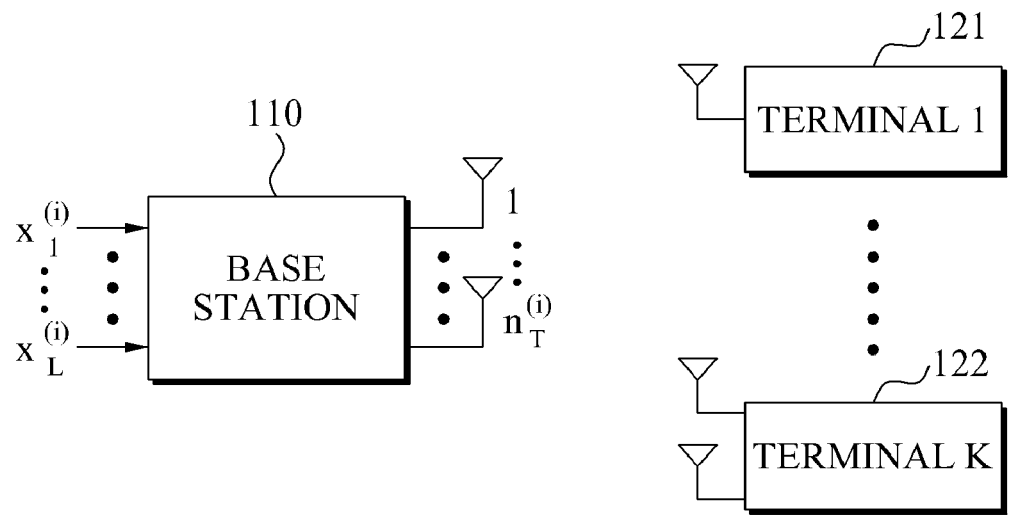
FIG. 1 is a diagram illustrating a base station and terminals included in a single-cell multi-user multiple input multiple output (MIMO) communication system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The term "base station" used throughout the present specification may include a general base station of a cellular communication system and various types of devices. For example, the base station may include a femto base station, a small base station such as a pico base station, a relay, and the like. Therefore, the base station may include devices that are used to serve various types of receivers such as terminals. Also, the term "terminal" used throughout the present specification may include a mobile device such as a cellular phone, a notebook, a smart phone, and the like, and may also include various types of devices receiving data signals from the base station or the relay.

Hereinafter, embodiments of the present invention will be described in detail with reference to the accompanying drawings.

FIG. 1 is a diagram illustrating a base station and terminals included in a single-cell multi-user multiple input multiple output (MIMO) communication system according to an embodiment of the present invention.

Referring to FIG. 1, the single-cell multi-user MIMO communication system may include a single base station 110 and K terminals (terminal 1, . . . , terminal K) 121 and 122. The base station 110 may include $$n_T^{(i)}$$

transmit antennas. Each of the terminals (terminal 1, . . . , terminal K) 121 and 122 may include at least one receive antenna. Here, i denotes an index of the base station 110. Channels may be formed between the base station 110 and the terminals (terminal 1, . . . , terminal K) 121 and 122. Each of the base station and the terminals (terminal 1, . . . , terminal K) 121 and 122 may transmit and receive various signals via the channels.

The base station 110 may transmit at least one data symbol to the terminals (terminal 1, . . . , terminal K) 121 and 122.

Here, the base station 110 may perform beamforming for the at least one data symbol according to a spatial division multiplexing access (SDMA) scheme. In particular, the base station 110 may determine a precoding matrix using a codebook, and precode at least one data symbol using the determined precoding matrix.

Here, a codebook $S^{(i)}$ may be expressed by the following Equation 1:

$$S^{(i)} = \{W_{n,L}^{(i)}, n=1, 2, \cdots, N, L=1, 2, \cdots, L_{max}\}. \quad \text{[Equation 1]}$$

Here, L denotes a number of layers and corresponds to a number of data symbols to be simultaneously transmitted.

$$W_{n,L}^{(i)}$$

denotes an $n^{th}$ codeword matrix, among codeword matrices included in the codebook $S^{(i)}$, with respect to the number of layers L. Also, a dimension of $W_{n,L}$ is $$n_T^{(i)} \times L.$$

The base station 110 may transmit well-known signals such as pilot signals to the terminals (terminal 1, . . . , terminal K) 121 and 122 via a downlink channel. Here, each of the terminals (terminal 1, . . . , terminal K) 121 and 122 may estimate a channel between the base station 110 and each of the terminals (terminal 1, . . . , terminal K) 121 and 122 using the pilot signals.

Each of the terminals (terminal 1, . . . , terminal K) 121 and 122 may select, as a preferred precoding matrix, any one matrix from the codebook matrices included in the codebook $S^{(i)}$ according to various types of criteria, based on the estimated channel. For example, each of the terminals (terminal 1, . . . , terminal K) 121 and 122 may select the preferred precoding matrix by considering various types of factors, for example, an achievable capacity, a signal-to-interference plus noise ratio (SINR), and the like.

Each of the terminals (terminal 1, . . . , terminal K) 121 and 122 may feed back the preferred precoding matrix to the base station 110. Here, information associated with the preferred precoding matrix is also referred to as a preferred matrix indicator (PMI) or a precoding matrix indicator (PMI).

Also, each of the terminals (terminal 1, . . . , terminal K) 121 and 122 may feed back, to the base station 110, information associated with a number of preferred layers. Each of the terminals (terminal 1, . . . , terminal K) 121 and 122 may feed back, to the base station 110, information associated with the achievable capacity, information associated with the SINR, and the like.

The base station 110 may determine the precoding matrix and the number of layers to be applied, based on information associated with the preferred precoding matrix and information associated with the number of preferred layers that are fed back from each of the terminals (terminal 1, . . . , terminal K) 121 and 122.

For example, the base station 110 may determine the number of layers L and generate the precoding matrix based on any one of codeword matrices with respect to the number of layers L, included in the codebook $S^{(i)}$. In particular, after the number of layers L is determined, any one codeword matrix may be selected as the precoding matrix from the codeword matrices included in the codebook $S^{(i)}$ with respect to the number of layers L.

When it is assumed that $$W_{n,L}^{(i)}$$

is determined as the precoding matrix, each of L vectors included in $$W_{n,L}^{(i)}$$

is a column vector and is referred to as a "precoding vector". Here, $$W_{n,L}^{(i)}$$

may be expressed by the following Equation 2:

$$W_{n,L}^{(i)} = [W_{n,L,1}^{(i)}, W_{n,L,2}^{(i)}, \ldots, W_{n,L,L}^{(i)}].\qquad \text{[Equation 2]}$$

Here, $$W_{n,L,l}^{(i)}$$

denotes an $l^{th}$ precoding vector among L precoding vectors included in $$W_{n,L}^{(i)}.$$

When L data symbols that the base station 110 desires to transmit are $$x = [x_1, x_2, \ldots, x_L]^T,$$

x may be referred to as a transmission symbol vector. Here, when $$W_{n(i),L}^{(i)}$$

is a precoding matrix, transmission signals $$y_L^{(i)} = [y_1^{(i)}, y_2^{(i)}, \ldots, y_{n_T^{(i)}}^{(i)}]^T$$

output via the transmit antennas of the base station 110 may be expressed by the following Equation 3:

$$y_L^{(i)} = W_{n(i),L}^{(i)} x. \qquad \text{[Equation 3]}$$

Here, $$y_m^{(i)}$$

denotes a signal output via an $m^{th}$ transmit antenna of the base station 110.

Figure 2:
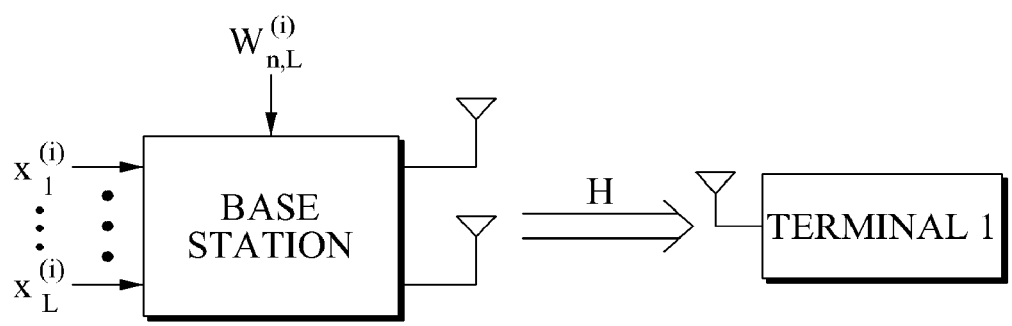
FIG. 2 is a diagram for describing a precoding matrix, and a channel and an effective channel between a base station and a terminal according to an embodiment of the present invention.

FIG. 2 is a diagram for describing a precoding matrix, and a channel and an effective channel between a base station and a terminal 1 according to an embodiment of the present invention.

Referring to FIG. 2, the channel between the base station and the terminal 1 may be expressed as "H". Here, the base station may precode L data symbols $$x = [x_1, x_2, \ldots, x_L]^T$$

using $$W_{n,L}^{(i)}.$$

A received signal vector r received by the terminal 1 via $n_R$ receive antennas may be expressed by the following Equation 4:

$$r = [r_1, r_2, \ldots, r_{n_R}]^T = H W_{n,L}^{(i)} x + z. \qquad \text{[Equation 4]}$$

Here, z denotes a sum of interference and noise.

It can be known from the above Equation 4 that x is transmitted from the base station to the terminal 1 via an effective channel $$H W_{n,L}^{(i)}.$$

Therefore, one of schemes to enhance a transmission rate to the terminal 1 may select or determine $$W_{n,L}^{(i)}$$

to maximize a magnitude of the effective channel $$H W_{n,L}^{(i)}.$$

Figure 3:
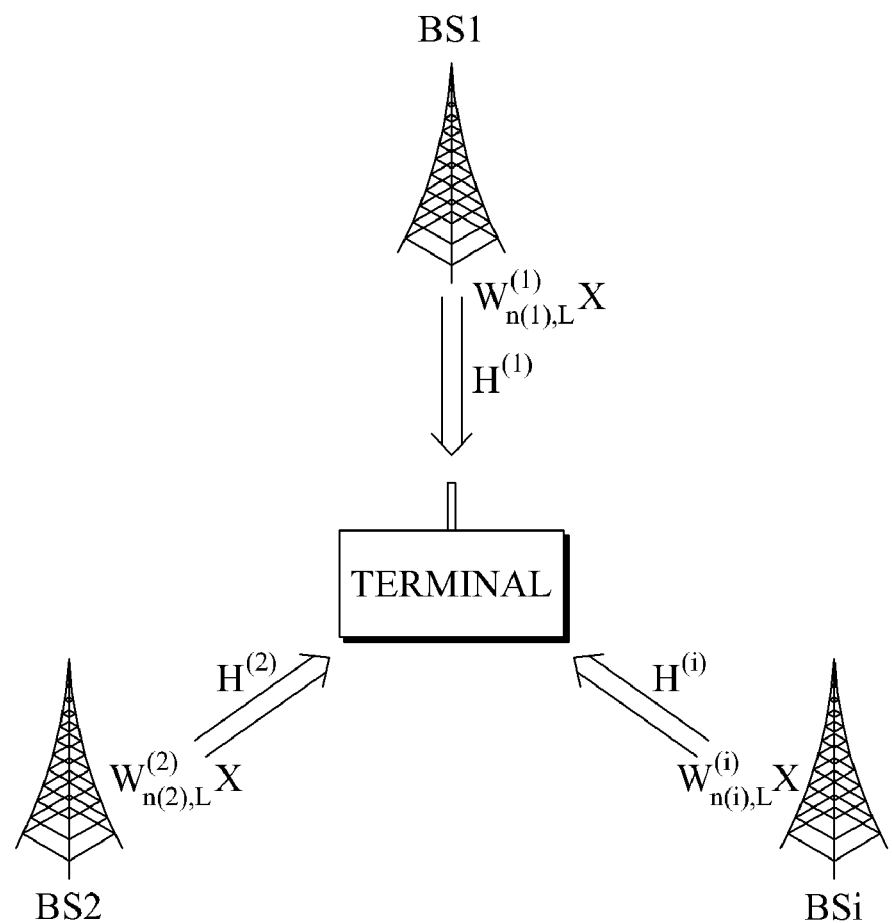
FIG. 3 is a diagram illustrating an example of a multi-cell MIMO communication system according to an embodiment of the present invention.

FIG. 3 is a diagram illustrating an example of a multi-cell MIMO communication system according to an embodiment of the present invention.

Referring to FIG. 3, a plurality of base stations (BS1, BS2, BSi) may serve a single terminal through a mutual cooperation. Here, any one base station among the plurality of base stations (BS1, BS2, BSi) may be referred to as a "serving base station", and the remaining base stations may be referred to as "neighboring base stations".

The base stations (BS1, BS2, BSi) may transmit the same transmission symbol vector x via channels $H^{(1)}$, $H^{(2)}$, and $H^{(i)}$, respectively.

When it is assumed that M base stations cooperate with each other, the received signal vector r received by the terminal via $n_R$ receive antennas may be expressed by the following Equation 5:

$$r = [r_1, r_2, \ldots, r_{n_R}]^T = \left\{ \sum_{i=1}^{M} H^{(i)} W_{n(i),L}^{(i)} \right\} x + z \qquad \text{[Equation 5]}$$

Here, $$W_{n(i),L}^{(i)}$$

denotes a precoding matrix that is used by the base station (BSi) as an $n(i)^{th}$ codeword matrix among codeword matrices included in a codebook $S^{(i)}$ with respect to a number of layers L. Here, the codebook $S^{(i)}$ denotes the codebook of the base station (BSi). Also, $H^{(i)}$ denotes a matrix that expresses a channel between the base station (BSi) and the terminal, and z denotes a sum of interference and noise.

For ease of description, with the assumption that two base stations transmit a transmission symbol vector x through a mutual cooperation, it will be described in detail with reference to FIG. 4.

Figure 4:
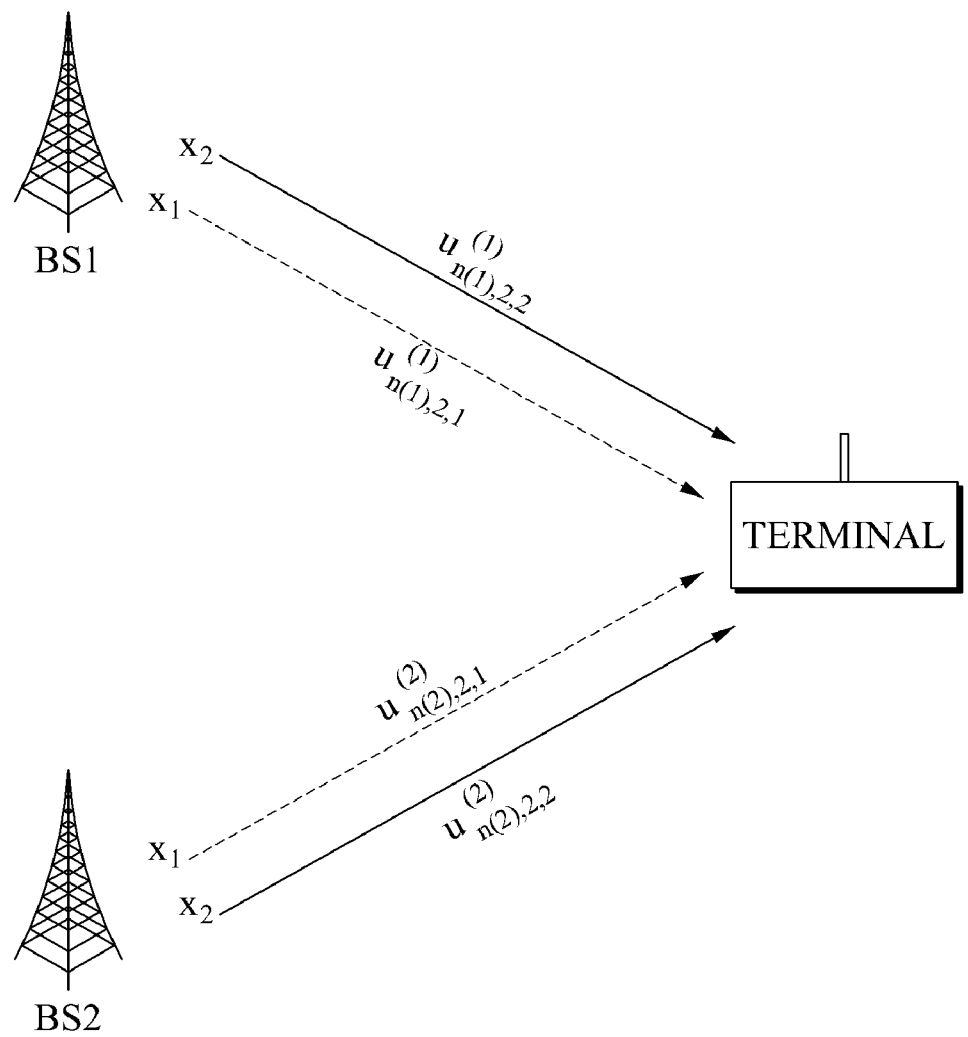
FIG. 4 is a diagram illustrating two base stations and a terminal in a multi-cell MIMO communication system according to an embodiment of the present invention.

FIG. 4 is a diagram illustrating two base stations (BS1, BS2) and a terminal in a multi-cell MIMO communication system according to an embodiment of the present invention.

When M=2, the two base stations (BS1, BS2) may transmit a transmission symbol vector x through a mutual cooperation. Here, it is assumed that the number of layers is two and the transmission symbol vector x includes two data symbols $x_1$ and $x_2$.

The received signal vector r may be expressed by the following Equation 6:

$$r = \{H^{(1)} W_{n(i),2}^{(1)} + H^{(2)} W_{n(i),2}^{(2)}\} x + z \qquad \text{[Equation 6]}$$
$$= \{H^{(1)} w_{n(i),2,1}^{(1)} + H^{(2)} w_{n(i),2,1}^{(2)}\} x_1 +$$
$$\{H^{(1)} w_{n(i),2,2}^{(1)} + H^{(2)} w_{n(i),2,2}^{(2)}\} x_2 + z$$

Here, when $$u_{n(i),L,l}^{(i)} = H^{(i)} W_{n(i),L,l}^{(i)}$$

is assumed, $$u_{n(i),L,l}^{(i)}$$

may be an effective channel between the base station (BSi) and the terminal with respect to an $l^{th}$ data symbol. Using the above effective channels, the received signal vector r of the above Equation 6 may be expressed by the following Equation 7:

$$r = \{u_{n(1),2,1}^{(1)} + u_{n(2),2,1}^{(2)}\} x_1 + \{u_{n(1),2,2}^{(1)} + u_{n(2),2,2}^{(2)}\} x_2 + z. \qquad \text{[Equation 7]}$$

Here, $$u_{n(1),2,1}^{(1)}$$

denotes an effective channel between the base station (BS1) and the terminal with respect to the data symbol $x_1$.

$u_{n(2),2,1}^{(2)}$ denotes an effective channel between the base station (BS2) and the terminal with respect to the data symbol $x_1$. Also, $u_{n(1),2,2}^{(1)}$ denotes an effective channel between the base station (BS1) and the terminal with respect to the data symbol $x_2$, and $u_{n(2),2,2}^{(2)}$ denotes an effective channel between the base station (BS2) and the terminal with respect to the data symbol $x_2$.

It can be known from the above Equation 7 that the data symbol $x_1$ may be received through a sum of $u_{n,(1),2,1}^{(1)}$ and $u_{n,(2),2,1}^{(2)}$, and the data symbol $x_2$ may be received through a sum of $u_{n,(1),2,2}^{(1)}$ and $u_{n(2),2,2}^{(2)}$.

To enhance a transmission rate to the terminal with respect to the data symbol $x_1$, a norm of the sum of $u_{n(1),2,1}^{(1)}$ and $u_{n(2),2,1}^{(2)}$ may need to increase. To enhance a transmission rate to the terminal with respect to the data symbol $x_2$, a norm of the sum of $u_{n(1),2,2}^{(1)}$ and $u_{n(2),2,2}^{(2)}$ may need to increase.

One of schemes to determine $W_{n(i),L}^{(i)}$ with respect to i=1, 2 may determine $W_{n(i),L}^{(i)}$ based on the effective channels in order to maximize a capacity of the terminal. Here, the capacity of the terminal may vary according to reception schemes of the terminal. For example, the terminal may use a minimum mean square error (MMSE) successive interference cancellation (SIC) reception scheme.

Here, when it is defined that $C_{2,m} \triangleq u_{n,(1),2,m}^{(1)} + u_{n(2),2,m}^{(2)}$, m=1, 2, the received signal vector r may be expressed by the following Equation 8:

$r = c_{2,1}x_1 + c_{2,2}x_2 + z.$ [Equation 8]

When it is assumed that the terminal uses the MMSE-SIC reception scheme and no error occurs during a process of estimating a received data symbol, the capacity of the terminal $C(W_{n(1),2}^{(1)}, W_{n(2),2}^{(2)})$ may be expressed by the following Equation 9:

$$C(W_{n(1),2}^{(1)}, W_{n(2),2}^{(2)}) = \log\left\{\prod_{m=1}^{M} [1 + c_{2,m}^H R_{conv,m}^{-1} c_{2,m}]\right\}$$ [Equation 9]

Here, $R_{conv,m}$ may be expressed by the following Equation 10:

$$R_{conv,m} = \sum_{l=m+1}^{M} c_{2,l} c_{2,l}^H + R_z$$ [Equation 10]

Here, $R_z = E[zz^H]$.

A criterion to determine the precoding matrix $W_{n(i),L}^{(i)}$ with respect to i=1, 2, may be expressed by the following Equation 11:

$$[\hat{W}_{n(1),2}^{(1)}, \hat{W}_{n(2),2}^{(2)}] = \arg\max_{W_{n(1),2}^{(1)} \in S^{(1)}, W_{n(2),2}^{(2)} \in S^{(2)}} C_{conv}(W_{n(1),2}^{(1)}, W_{n(2),2}^{(2)}).$$ [Equation 11]

The terminal may feed back, to the base station, information association with the preferred precoding matrix, that is, information associated with $\hat{W}_{n(1),2}^{(1)}, \hat{W}_{n(2),2}^{(2)}$, and information associated with an achievable capacity $C_{conv}(\hat{W}_{n(1),2}^{(1)}, \hat{W}_{n(2),2}^{(2)})$.

Here, the codebook $S^{(i)}$ includes N codeword matrices. Therefore, in order to obtain $C_{conv}(\hat{W}_{n(1),2}^{(1)}, \hat{W}_{n(2),2}^{(2)})$, when i=1, 2, $C(W_{n(1),2}^{(1)}, W_{n(2),2}^{(2)})$ may need to be calculated with respect to a total of $N^2$ cases. For example, when N=16, $C(W_{n(1),2}^{(1)}, W_{n(2),2}^{(2)})$ may need to be calculated a total of 16×16=256 times. In this case, calculation amounts may be significantly great and thus may need to be appropriately reduced.

One of schemes to reduce calculation amounts may sequentially obtain $\hat{W}_{n(2),2}^{(2)}$ and $\hat{W}_{n(1),2}^{(1)}$.

For example, the terminal may obtain $\hat{W}_{n(2),2}^{(2)}$, and may subsequently obtain $\hat{W}_{n(1),2}^{(1)}$ that may maximize $$C_{conv}(\hat{W}_{n(1),2}^{(1)}, \hat{W}_{n(2),2}^{(2)})$$

with respect to $$\hat{W}_{n(2),2}^{(2)}.$$

The aforementioned process where the terminal obtains $$\hat{W}_{n(2),2}^{(2)}$$

and sequentially obtains $$\hat{W}_{n(1),2}^{(1)}$$

may be expressed by the following Equation 12:

$$\hat{W}_{n(2),2}^{(2)} = \arg \max_{W_{n(2),2}^{(2)} \in S^{(2)}} c_{2,m}^H R_{conv,m}^{-1} c_{2,m} \quad \text{[Equation 12]}$$

$$\hat{W}_{n(1),2}^{(1)} = \arg \max_{W_{n(1),2}^{(1)} \in S^{(1)}} C_{conv}(W_{n(1),2}^{(1)}, \hat{W}_{n(2),2}^{(2)})$$

As described above, according to a scheme of sequentially obtaining $$\hat{W}_{n(2),2}^{(2)}$$

and $$\hat{W}_{n(1),2}^{(1)},$$

the terminal may calculate $$C(W_{n(1),2}^{(1)}, W_{n(2),2}^{(2)})$$

with respect only to 2N cases, and thereby may obtain $$\hat{W}_{n(2),2}^{(2)}$$

and $$\hat{W}_{n(1),2}^{(1)}.$$

Accordingly, it is possible to significantly reduce calculation amounts.

Figure 5:
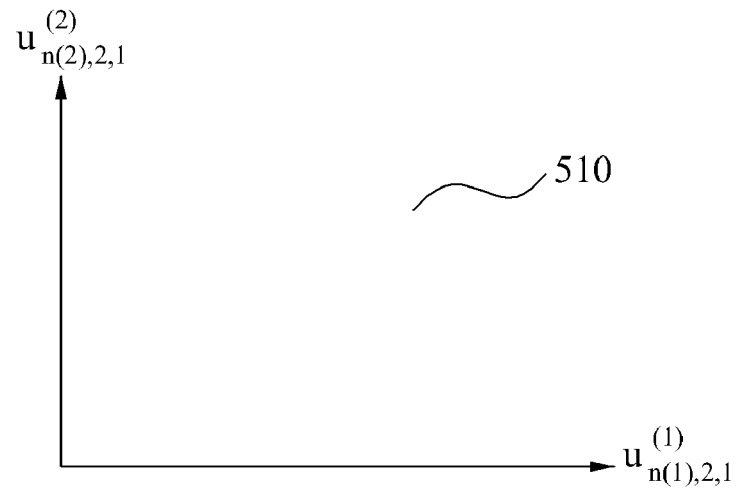
FIG. 5 is a conceptual diagram illustrating an effective channel between a base station (BS1) and a terminal, and an effective channel between a base station (BS2) and the terminal with respect to a data symbol $x_1$ according to an embodiment of the present invention.
Figure 5:
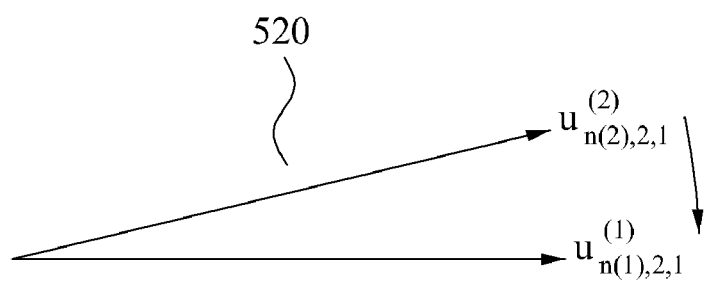

FIG. 5 is a conceptual diagram illustrating an effective channel between a base station (BS1) and a terminal, and an effective channel between a base station (BS2) and the terminal with respect to a data symbol $x_1$ according to an embodiment of the present invention.

Prior to making a description, when at least two base stations exist as shown in FIG. 4, the terminal may receive data symbols from the at least two base stations via at least two effective channels, respectively. A single data symbol may be transmitted from the at least two base stations to the terminal via the at least two effective channels.

When each of the at least two base stations independently determines and uses a precoding matrix, effective channels between the at least two base stations and the terminal with respect to a single data symbol may be inappropriately arranged. Accordingly, there is a need for a technology that may appropriately arrange at least two effective channels associated with a single data symbol.

It has been described above with reference to FIG. 4 that a norm of the sum of $$u_{n(1),2,1}^{(1)}$$

and $$u_{n(2),2,1}^{(2)}$$

may need to be maximized in order to enhance a transmission rate to the terminal with respect to the data symbol $x_1$.

Referring to a diagram 510 of FIG. 5, a chordal distance or an angle between $$u_{n(1),2,1}^{(1)}$$

and $$u_{n(2),2,1}^{(2)}$$

is relatively great. Therefore, it is predicted that the norm of the sum of $$u_{n(1),2,1}^{(1)}$$

and $$u_{n(2),2,1}^{(2)}$$

is relatively small. When $$u_{n(1)2,1}^{(1)}$$

and $$u_{n(2),2,1}^{(2)}$$

are arranged as shown in the diagram 510, it is predicted that the transmission rate to the terminal with respect to the data symbol $x_1$ is relatively small.

Referring to a diagram 520 of FIG. 5, a chordal distance or an angle between $$u_{n(1),2,1}^{(1)}$$

and $$u_{n(2),2,1}^{(2)}$$

is relatively small. Therefore, it is predicted that the norm of the sum of $$u_{n(1),2,1}^{(1)}$$

and $$u_{n(2),2,1}^{(2)}$$

is relatively great. When $$u_{n(1),2,1}^{(1)}$$

and $$u_{n(2),2,1}^{(2)}$$

are arranged as shown in the diagram 520, it is predicted that the transmission rate to the terminal with respect to the data symbol $x_1$ is relatively great.

Figure 6:
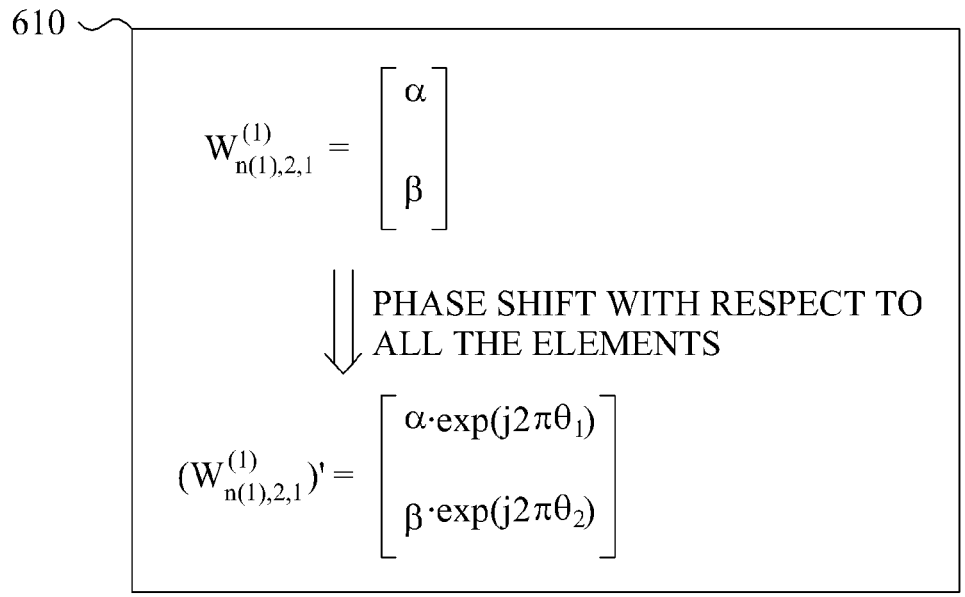
FIG. 6 illustrates examples of shifting phases of elements included in a precoding matrix according to an embodiment of the present invention.
Figure 6:
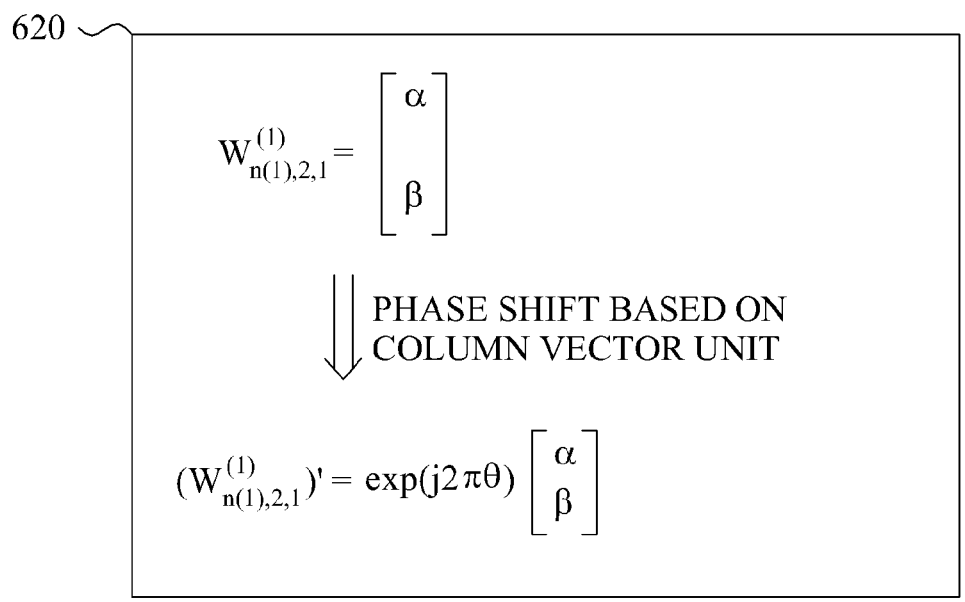

FIG. 6 illustrates examples 610 and 620 of shifting phases of elements included in a precoding matrix according to an embodiment of the present invention.

Referring to FIG. 6, according to an embodiment of the present invention, it is possible to individually or collectively shift phases of all the elements included in the precoding matrix. Specifically, effective channels may be appropriately arranged with respect to each data symbol by shifting a phase of at least one element among the elements included in the precoding matrix. Accordingly, a capacity of a terminal may be maximized or increase by appropriately arranging the effective channels.

A first precoding vector of the precoding matrix $$W_{n(1),2}^{(1)}$$

is $$W_{n(1)2,1}^{(1)}.$$

Here, it is assumed that elements of $$W_{n(1)2,1}^{(1)}$$

are $\alpha$ and $\beta$.

Here, it is possible to individually shift a phase of each of $\alpha$ and $\beta$. Referring to the example 610 of FIG. 6, it is possible to shift the phase of $\alpha$ by $$\theta_1,$$

and to shift the phase of by $$\theta_2.$$

Here, $$W_{n(1)2,1}^{(1)}$$

may be expressed by $$(W_{n(1),2,1}^{(1)})'.$$

Also, according to an embodiment of the present invention, it is possible to collectively shift phases of $\alpha$ and $\beta$. Specifically, it is possible to apply a phase shift based on a column vector unit. Referring to the example 620 of FIG. 6, it is possible to shift the phases of both $\alpha$ and $\beta$ by $$\theta.$$

Here, $$W_{n(1)2,1}^{(1)}$$

may also be expressed by $$(W_{n(1),2,1}^{(1)})'.$$

Hereinafter, a process of shifting a phase of at least one element among elements included in a precoding matrix will be further described in detail.

According to an embodiment of the present invention, the phase of at least one element among the elements included in the precoding matrix $$W_{n(i),L}^{(i)}$$

may be appropriately shifted using a phase shift matrix $$D_L^{(i)}.$$

Here, the phase shift matrix $$D_L^{(i)}$$

may have various types of forms, and may be in a simple form of a diagonal matrix. The phase shift matrix $$D_L^{(i)}$$

may have an L×L dimension. In particular, the phase shift matrix $$D_L^{(i)}$$

in the form of the diagonal matrix may collectively shift phases of all the elements, included in the precoding vector, to be the same based on the column vector unit.

The phase shift matrix $$D_L^{(i)}$$

in the form of the diagonal matrix may be expressed by the following Equation 13:

$$D_L^{(i)} = \mathrm{diag}(a_1^{(i)}, a_2^{(i)}, \ldots, a_L^{(i)}). \qquad \text{[Equation 13]}$$

Here, with respect to l=1, 2, 3, . . . L, a phase of $$a_l^{(i)}$$

may be different, but a magnitude thereof may be the same. Specifically, $$a_l^{(i)}$$

may be expressed by the following Equation 14:

$$a_l^{(i)} = \exp(j2\pi\theta_l^{(i)}), l=1, 2, \ldots, L. \qquad \text{[Equation 14]}$$

Also, among base stations participating in a multi-cell cooperative communication, any one base station, for example, a base station of a cell including a terminal may use, as the phase shift matrix $$D_L^{(i)},$$

a unitary matrix $I_{L \times L}$ having an L×L dimension. Here, the base stations participating in the multi-cell cooperative communication may include a serving base station and at least one neighboring base station.

The terminal may feed back information associated with a preferred phase shift matrix to the serving base station. The serving base station may determine and use a corresponding phase shift matrix based on information associated with the preferred phase shift matrix. Here, each of the at least one neighboring base station may receive, from the serving base station, information associated with the determined phase shift matrix to use the phase shift matrix.

The terminal, the serving base station, and the at least one neighboring base station may store and use the same codebook with respect to the phase shift matrix.

The codebook with respect to the phase shift matrix may be designed into various types. For example, the codebook may include candidate matrices with respect to the phase shift matrix $$D_L^{(i)},$$

and may also include individual candidate matrices with respect to each of L elements.

When shifting a phase of at least one element among elements included in the precoding matrix $$W_{n(i),L}^{(i)}$$

using the phase shift matrix $$D_L^{(i)},$$

a transmission signal of a base station (BSi) may be expressed by the following Equation 15:

$$y_L^{(i)} = W_{n(i),L}^{(i)} D_L^{(i)} x.$$

Here, when each of M base stations uses a corresponding phase shift matrix $$D_L^{(i)}$$

and transmits the same transmission symbol vector, a received signal vector $r_{pro}$ of the terminal may be expressed by the following Equation 16:

$$r_{pro} = \left\{ \sum_{i=1}^{M} H^{(i)} W_{n(i),L}^{(i)} D_L^{(i)} \right\} x + z \qquad \text{[Equation 16]}$$

Here, for ease of description, it is assumed that M=2 and a number of layers is 2.

Here, the received signal vector $r_{pro}$ of the above Equation 16 may be expressed by the following Equation 17:

$$r_{pro} = \{a_1^{(1)} u_{n(1),2,1}^{(1)} + a_1^{(2)} u_{n(2),2,1}^{(2)}\} x_1 + \{a_2^{(1)} u_{n(1),2,2}^{(1)} + a_2^{(2)} u_{n(2),2,2}^{(2)}\} x_2 + z. \qquad \text{[Equation 17]}$$

Here, the above Equation 17 may be defined as given by the following Equation 18:

$$\tilde{a}_1^{(2)} = a_1^{(2)}/a_1^{(1)}, \tilde{a}_2^{(2)} = a_2^{(2)}/a_2^{(1)}. \qquad \text{[Equation 18]}$$

The above Equation 17 may be expressed by the following Equation 19:

$$r_{pro} = a_1^{(1)}\{u_{n(1),2,1}^{(1)} + \tilde{a}_1^{(2)} u_{n(2),2,1}^{(2)}\}x_1 + a_2^{(1)} \{u_{n(1),2,2}^{(1)} + \tilde{a}_2^{(2)} u_{n(2),2,2}^{(2)}\}x_2 + z. \quad \text{[Equation 19]}$$

It can be known from the above Equation 19 that a sum of the effective channel between the base station (BS1) and the terminal, and the effective channel between the base station (BS2) and the terminal with respect to the data symbol $x_1$ is $$a_1^{(1)}\{u_{n(1),2,1}^{(1)} + \tilde{a}_1^{(2)} u_{n(2),2,1}^{(2)}\},$$

and a sum of the effective channel between the base station (BS1) and the terminal, and the effective channel between the base station (BS2) and the terminal 2 with respect to the data symbol $x_2$ is $$a_2^{(1)}\{u_{n(1),2,2}^{(1)} + \tilde{a}_2^{(2)} u_{n(2),2,2}^{(2)}\}.$$

When comparing the above Equation 7 and Equation 19, $$u_{n(1),2,1}^{(1)}$$

and $$u_{n(2),2,1}^{(2)}$$

are simply added up with respect to the data symbol $x_1$ in the above Equation 7, whereas phases of $$u_{n(1),2,1}^{(1)}$$

and $$u_{n(2),2,1}^{(2)}$$

vary in the above Equation 19.

Accordingly, it is possible to maximize a transmission rate of the data symbol $x_1$ and the data symbol $x_2$ by appropriately determining the phase shift matrix $$D_L^{(i)}.$$

For example, when $$\tilde{a}_1^{(2)}$$

is appropriately determined, $$\|u_{n,2,1}^{(1)} + \tilde{a}_1^{(2)} u_{n,2,1}^{(2)}\|^2$$

may become greater than $$\|u_{n,2,2}^{(1)} + u_{n,2,2}^{(2)}\|^2.$$

Also, when $$\tilde{a}_2^{(2)}$$

is appropriately determined, $$\|u_{n,2,2}^{(1)} + \tilde{a}_2^{(2)} u_{n,2,2}^{(2)}\|^2$$

may also become greater than $$\|u_{n,2,2}^{(1)} + u_{n,2,2}^{(2)}\|^2.$$

Accordingly, it is possible to appropriately determine the phase shift matrix $$D_L^{(1)}$$

so that $$\|u_{n,2,1}^{(1)} + \tilde{a}_1^{(2)} u_{n,2,1}^{(2)}\|^2$$

and $$\|u_{n,2,2}^{(1)} + \tilde{a}_2^{(2)} u_{n,2,2}^{(2)}\|_2$$

may be maximized.

Also, according to an embodiment of the present invention, it is possible to determine the phase shift matrix $$D_L^{(i)}$$

according to various criteria. For example, the phase shift matrix $$D_L^{(i)}$$

may be determined to maximize a capacity of the terminal. Also, the phase shift matrix $$D_L^{(i)}$$

may be determined to decrease interference occurring between data symbols.

Also, according to an embodiment of the present invention, it is possible to maximize a capacity of a terminal by appropriately determining a transmit power. Specifically, a power weight $P^{(i)}$ may be used to adaptively adjust the transmit power. Here, $P^{(i)}$ denotes a real number.

With respect to $i=1, 2, 3, \ldots, M$, the terminal may feed back, to the serving base station, information associated with a preferred power weight. Here, the serving base station may appropriately determine the transmit power based on information associated with the preferred power weight, and may apply the determined transmit power. Also, the serving base station may transfer information associated with the determined transmit power to at least one neighboring base station, so that the at least one neighboring base station may apply the adaptively adjusted transmit power.

Specifically, each of the serving base station and the at least one neighboring base station may adaptively apply the power weight $P^{(i)}$. Here, a particular base station not participating in the multi-cell cooperative communication may determine the power weight $P^{(i)}$ of zero.

Also, according to an embodiment of the present invention, there is provided a method of effectively selecting and determining the preferred precoding matrix $$W_{n(i),L}^{(i)}$$

and the preferred phase shift matrix $$D_L^{(i)}.$$

Hereinafter, the method will be described in detail.

The terminal may determine the preferred precoding matrix $$W_{n(i),L}^{(i)}$$

and the preferred phase shift matrix $$D_L^{(i)}$$

by considering effective channels with respect to each data symbol. In particular, the terminal may calculate a capacity, an SINR, and the like, from the received signal vector $$r_{pro} = \left\{\sum_{i=1}^{M} H^{(i)} W_{n(i),L}^{(i)} D_L^{(i)}\right\} x + z$$

The terminal may calculate the preferred precoding matrix $$W_{n(i),L}^{(i)}$$

and the preferred phase shift matrix $$D_L^{(i)}$$

based on the capacity, the SINR, and the like.

Also, according to an embodiment of the present invention, it is possible to simultaneously calculate the preferred precoding matrix $$W_{n(i),L}^{(i)}$$

and the preferred phase shift matrix $$D_L^{(i)}$$

so that the capacity, the SINR, and the like may be maximized. Here, to simultaneously calculate the preferred precoding matrix $$W_{n(i),L}^{(i)}$$

and the preferred phase shift matrix $$D_L^{(i)}$$

may require large calculation amounts and thus may not be well applicable to the terminal.

In this case, it is possible to reduce calculation amounts by sequentially calculating the preferred precoding matrix $$W_{n(i),L}^{(i)}$$

and the preferred phase shift matrix $$D_L^{(i)}.$$

For example, the calculation amounts may be reduced by initially finding the number of preferred layers L and the preferred precoding matrix $$W_{n(i),L}^{(i)},$$

and subsequently finding the preferred phase shift matrix $$D_L^{(i)}.$$

Specifically, it is assumed that, to find a preferred precoding matrix $$W_{n(i_0),L}^{(i_0)}$$

with respect to a base station $i_0$, a received signal vector includes only z and a signal transmitted from the base station $i_0$, as given by the following Equation 20:

$$r^{(i_0)} = \{H^{(i_0)} W_{n(i_0),L}^{(i_0)}\} D_L^{(i_0)} x + z, \ i_0=1, 2, \text{---}, M.$$

Here, the terminal may find the preferred precoding matrix $$W_{n(i_0),L}^{(i_0)}$$

and the number of preferred layers L, maximizing a capacity, according to various types of reception schemes such as an MMSE-SIC reception scheme and the like. For example, with respect to $i_0=1, 2, 3, \ldots, M$, the capacity of the terminal according to the MMSE-SIC reception scheme may be expressed by the following Equation 21:

$$C_{pro}^{(i_0)}(W_{n(i_0),2}^{(i_0)}) = \log\left\{\prod_{m=1}^{M}\left[1 + u_{n(i_0),2,m}^{(i_0)H} R_{pro,m}^{(i_0)-1} u_{n(i_0),2,m}^{(i_0)}\right]\right\}, \quad \text{[Equation 21]}$$

$$i_0 = 1, 2, \ldots, M$$

Here, $$u_{n(i),L,1}^{(i)} = H^{(i)} w_{n(i),L,1}^{(i)},$$

and $$R_{pro,m}^{(i_0)}$$

may be expressed by the following Equation 22:

$$R_{pro,m}^{(i)} = \sum_{l=m+1}^{M} u_{n(i),2,l}^{(i)} u_{n(i),2,l}^{(i)H} + R_z. \quad \text{[Equation 22]}$$

$$w_{n(1),L}^{(1)}$$

and $$w_{n(2),L}^{(2)}$$

may be determined using the following Equation 23:

$$\hat{W}_{n(i_0),2}^{(i_0)} = \arg\max_{W_{n(i_0),2}^{(i_0)} \in S^{(i_0)}} C_{pro}^{(i_0)}(W_{n(i_0),2}^{(i_0)}), \quad \text{[Equation 23]}$$

$$i_0 = 1, 2, \ldots, M$$

To find the preferred precoding matrix $$W_{n(i_0),L}^{(i_0)}$$

with respect to $i_0=1, 2, 3, \ldots, M$, according to the above Equation 23 may require a calculation amount to be in proportion to MN. Specifically, it has been described above with reference to the above Equation 11 that to simultaneously find all the preferred precoding matrices with respect to $i_0=1, 2, 3, \ldots, M$ may require a calculation amount in proportion to $N^M$, and to individually find a preferred precoding matrix with respect to $i_0=1, 2, 3, \ldots, M$ after assuming that the received signal vector includes only z and a signal transmitted from the base station $i_0$ may require a calculation amount in proportion to MN.

When the number of preferred layers L and the preferred precoding matrix $$W_{n(i),L}^{(i)}$$

are determined, the preferred phase shift matrix $$D_L^{(i)}$$

may be obtained. Here, the preferred phase shift matrix $$D_L^{(i)}$$

may be obtained to maximize the capacity of the terminal.

According to an embodiment of the present invention, $$\tilde{a}_1^{(2)}$$

and $$\tilde{a}_2^{(2)}$$

may be obtained using the above Equation 18 and Equation 19 so that each of $$\|u_{n,2,1}^{(1)} + \tilde{a}_1^{(2)} u_{n,2,1}^{(2)}\|^2$$

and $$\|u_{n,2,2}^{(1)} + \tilde{a}_2^{(2)} u_{n,2,2}^{(2)}\|^2$$

may be maximized. The capacity of the terminal may be calculated with respect to the obtained $$\tilde{a}_1^{(2)}$$

and $$\tilde{a}_2^{(2)}.$$

A preferred phase shift matrix may be determined by selecting $$a_1^{(1)}$$

and $$a_2^{(1)}$$

so that the calculated capacity may be maximized.

As described above, according to an embodiment of the present invention, a terminal may feed back, to a serving base station, information regarding a number of preferred layers, a preferred precoding matrix, a preferred phase shift matrix, and an achievable capacity. The terminal may also feed back information associated with a preferred power weight. The serving base station may determine a precoding matrix, a phase shift matrix, and a power weight, that is, a transmit power to be substantially applied. The serving base station may transfer, to at least one neighboring base station, information regarding the determined precoding matrix, the phase shift matrix, and the power weight, that is, the transmit power.

Figure 7:
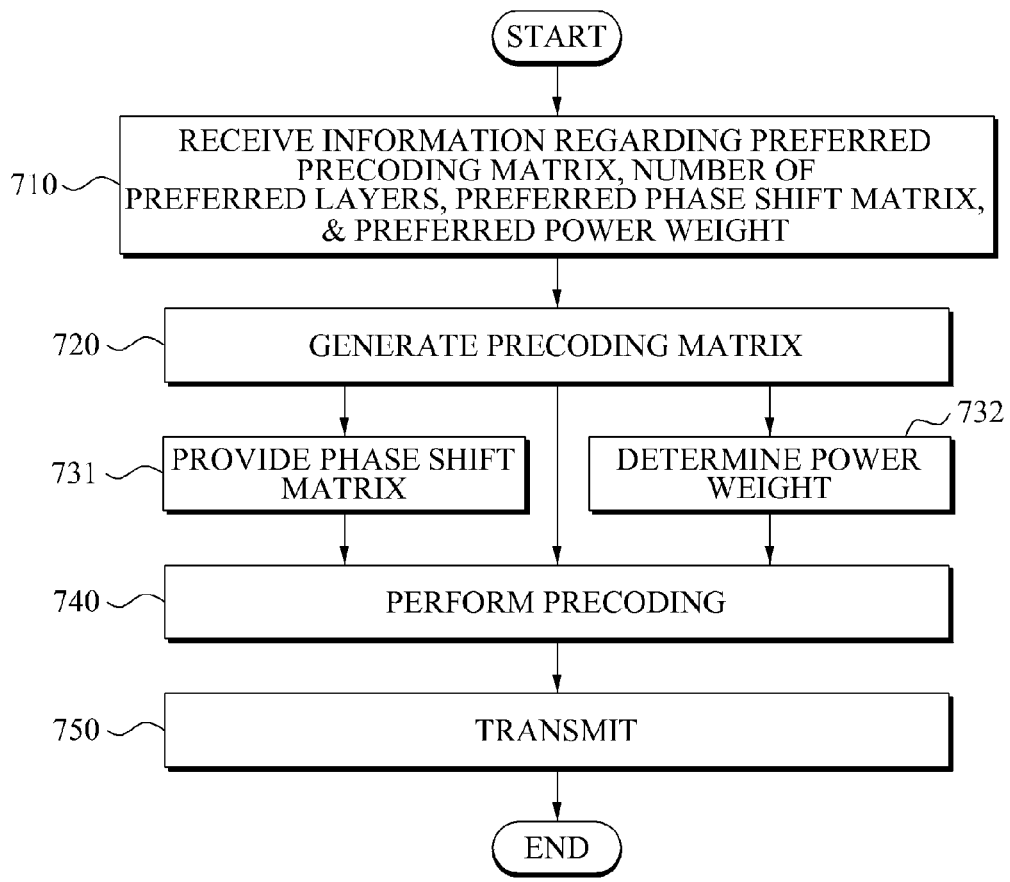
FIG. 7 is a flowchart illustrating a method of operating a serving base station according to an embodiment of the present invention.

FIG. 7 is a flowchart illustrating a method of operating a serving base station according to an embodiment of the present invention.

In operation 710, the serving base station among base stations participating in a multi-cell cooperative communication may receive, from a terminal, information regarding a preferred precoding matrix, a number of preferred layers, a preferred phase shift matrix, and a preferred power weight.

In operation 720, the serving base station may generate a precoding matrix, based on information regarding the preferred precoding matrix and the number of preferred layers. Here, a plurality of codeword matrices used to determine the precoding matrix may be stored in a memory of the serving base station.

In operation 731, the serving base station may determine and provide a phase shift matrix based on information associated with the preferred phase shift matrix. In operation 732, the serving base station may determine a power weight based on information associated with the preferred power weight. A plurality of candidate matrices may be stored in the memory of the serving base station to determine the phase shift matrix.

In operation 740, the serving base station may precode at least one data symbol based on the precoding matrix, the number of layers, the phase shift matrix, and the power weight. Here, a phase of at least one element among elements included in the precoding matrix may be shifted using the phase shift matrix.

In operation 750, the serving base station may transmit the precoded at least one data symbol via a plurality of transmit antennas. Here, at least one neighboring base station may cooperate with the serving base station to thereby transmit the same at least one data symbol.

Figure 8:
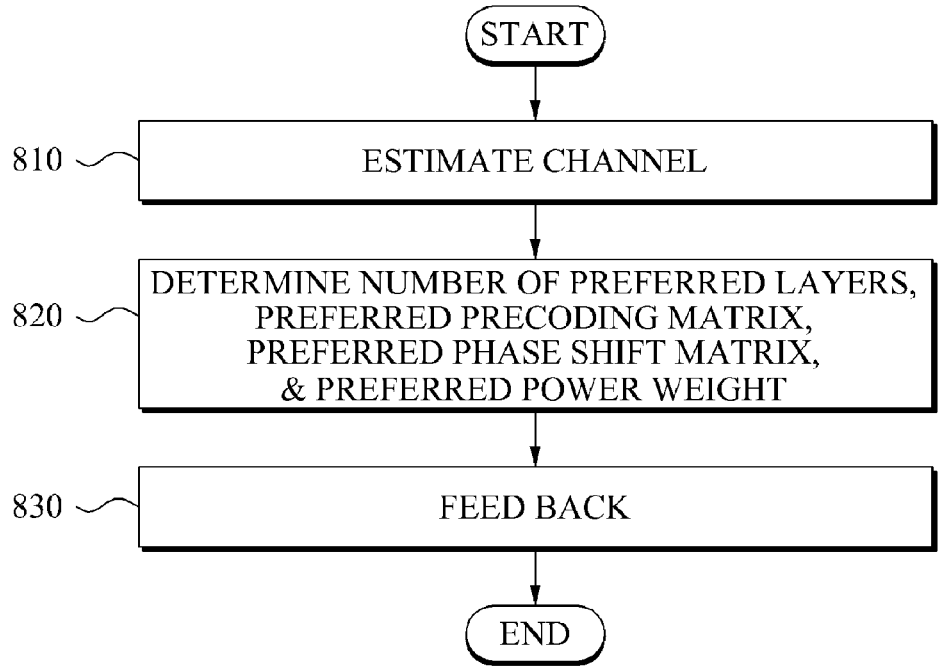
FIG. 8 is a flowchart illustrating a method of operating a terminal according to an embodiment of the present invention.

FIG. 8 is a flowchart illustrating a method of operating a terminal according to an embodiment of the present invention.

In operation 810, the terminal may estimate a channel between the terminal and each of a serving base station and at least one neighboring base station. Specifically, the serving base station and the at least one neighboring base station may transmit a reference signal such as a pilot signal to the terminal. The terminal may estimate the channel based on the reference signal.

In operation 820, the terminal may determine a number of preferred layers, a preferred precoding matrix, a preferred phase shift matrix, and a preferred power weight based on the estimated channel. Specifically, the terminal may predict an effective channel based on the estimated channel whereby an SINR and an achievable capacity of the terminal may be calculated. The terminal may determine the number of preferred layers, the preferred precoding matrix, the preferred phase shift matrix, and the preferred power weight, based on the predicted effective channel, the calculated achievable capacity, and the SINR.

A scheme of determining the number of preferred layers, the preferred precoding matrix, the preferred phase shift matrix, and the preferred power weight, and schemes of reducing a calculation amount have been described above.

In operation 830, the terminal may feed back, to the serving base station, information regarding the number of preferred layers, the preferred precoding matrix, the preferred phase shift matrix, and the preferred power weight. In this instance, the serving base station may determine a number of layers, a precoding matrix, a phase shift matrix, and a power weight, that is, a transmit power to be substantially applied, based on information regarding the number of preferred layers, the preferred precoding matrix, the preferred phase shift matrix, and the preferred power weight. The serving base station may transfer, to the at least one neighboring base station, information regarding the determined number of layers, the precoding matrix, the phase shift matrix, and the power weight, that is, the transmit power.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Figure 9:
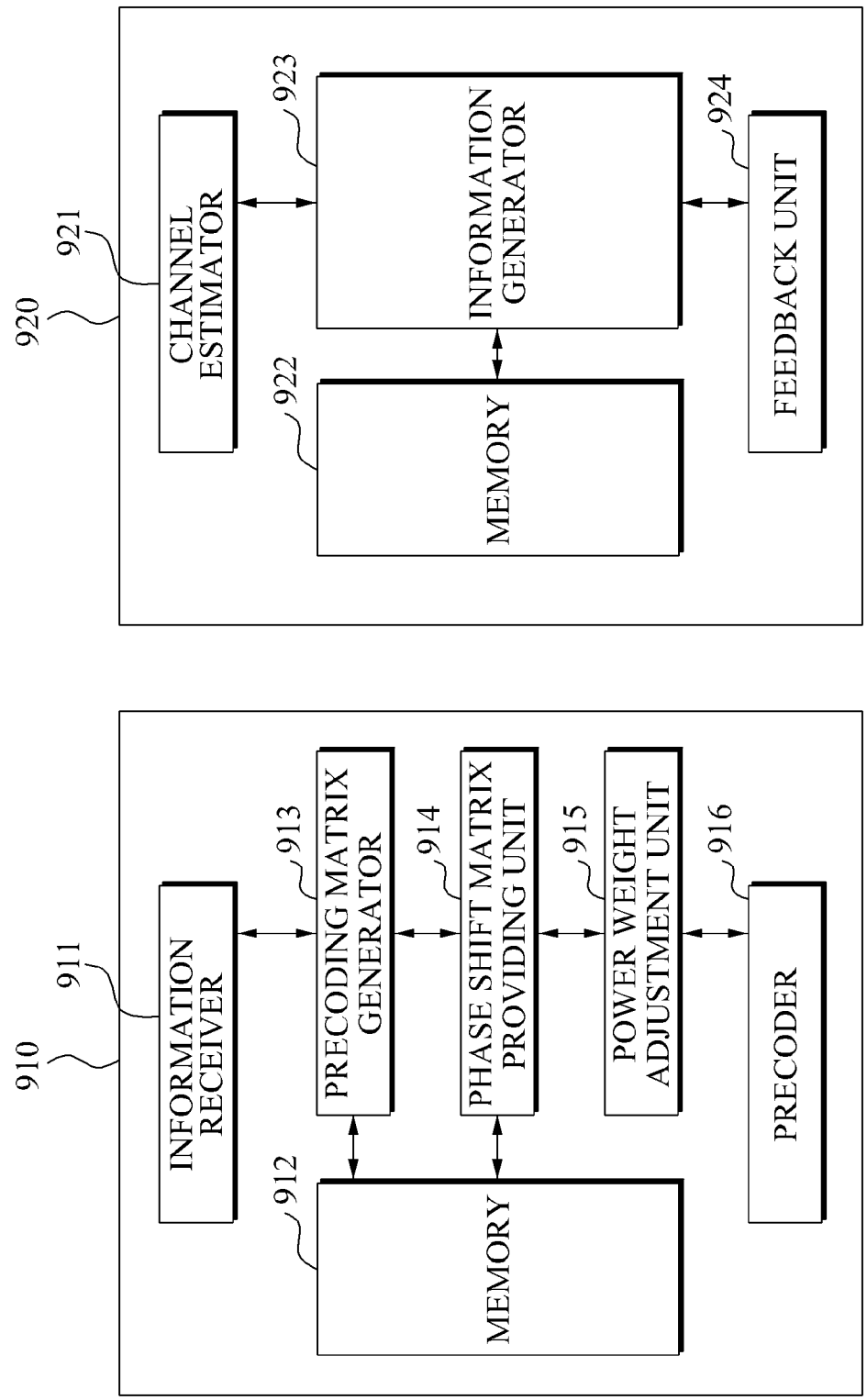
FIG. 9 is a block diagram illustrating a configuration of a serving base station and a terminal according to an embodiment of the present invention.

FIG. 9 is a block diagram illustrating a configuration of a serving base station 910 and a terminal 920 according to an embodiment of the present invention.

Referring to FIG. 9, the serving base station 910 may include an information receiver 911, a memory 912, a precoding matrix generator 913, a phase shift matrix providing unit 914, a power weight adjustment unit 915, and a precoder 916.

The information receiver 911 may receive, from the terminal 920, information regarding a number of preferred layers, a preferred precoding matrix, a preferred power weight, and a preferred phase shift matrix.

The precoding matrix generator 913 may select a precoding matrix based on information regarding the number of preferred layers and the preferred precoding matrix, and a plurality of codeword matrices that are pre-stored in the memory 912.

The phase shift matrix providing unit 914 may determine and provide a phase shift matrix based on information associated with the preferred phase shift matrix. Here, a plurality of candidate matrices used to determine the phase shift matrix may be stored in the memory 912.

The power weight adjustment unit 915 may determine a power weight, that is, a transmit power based on information associated with the preferred power weight.

The precoder 916 may precode at least one data symbol using the precoding matrix, the phase shift matrix, and the power weight.

The terminal 920 may include a channel estimator 921, a memory 922, an information generator 923, and a feedback unit 924.

The channel estimator 921 may estimate a channel between each of base stations and the terminal 920. Here, the information generator 923 may generate information associated with the preferred precoding matrix, based on the estimated channel and a plurality of codeword matrices pre-stored in the memory 922.

The information generator 923 may additionally generate information regarding the number of preferred layers, the preferred phase shift matrix, and the preferred power weight. Here, the preferred precoding matrix, the number of preferred layers, the preferred phase shift matrix, and the preferred power weight may be sequentially determined, or may also be simultaneously determined.

The feedback unit 924 may feed back, to the serving base station 910, information regarding the preferred precoding matrix, the number of preferred layers, the preferred phase shift matrix, and the preferred power weight. Here, the serving base station 910 may determine a number of layers, a precoding matrix, a phase shift matrix, and a power weight, that is, a transmit power to be substantially applied, based on information regarding the number of preferred layers, the preferred precoding matrix, the preferred phase shift matrix, and the preferred power weight. The serving base station 910 may transfer, to at least on neighboring base station, information regarding the determined number of layers, the precoding matrix, the phase shift matrix, and the power weight, that is, the transmit power.

Figure 10:
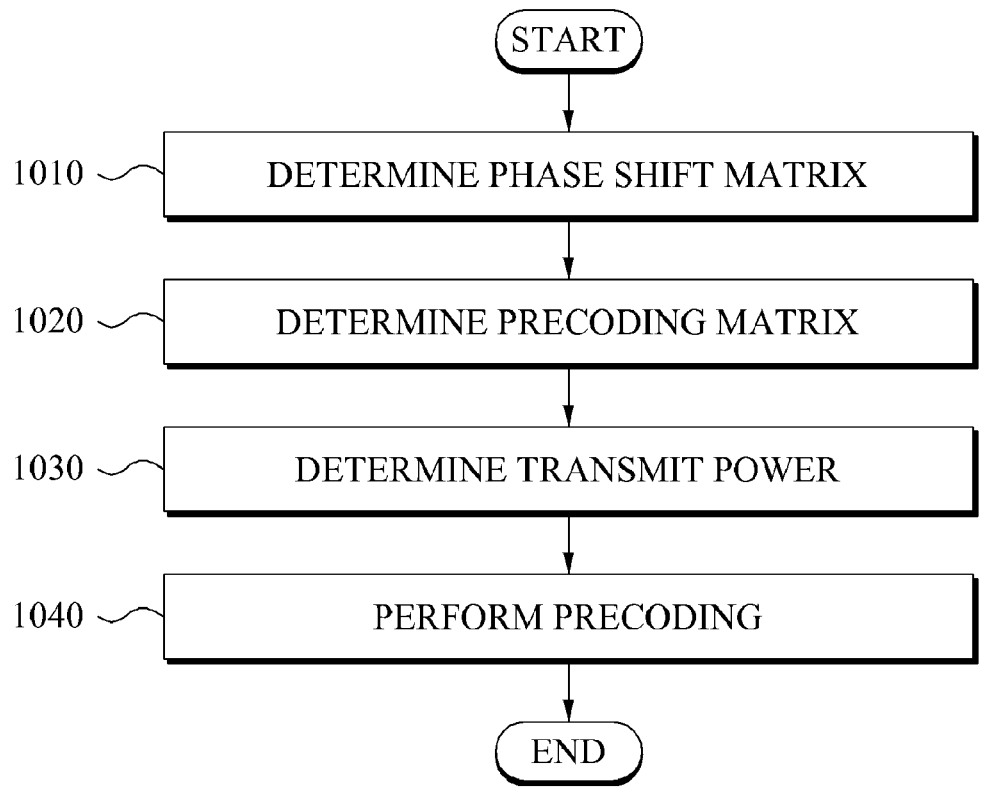
FIG. 10 is a flowchart illustrating a method of operating a neighboring base station according to an embodiment of the present invention.

FIG. 10 is a flowchart illustrating a method of operating a neighboring base station according to an embodiment of the present invention.

In operation 1010, the neighboring base station may determine a phase shift matrix based on information associated with a preferred phase shift matrix received from a serving base station.

Specifically, the neighboring base station may store a plurality of candidate matrices in a memory, and may verify, from the plurality of candidate matrices, a candidate matrix corresponding to information associated with the preferred phase shift matrix. The neighboring base station may determine a phase shift matrix based on the verified candidate matrix.

In operation 1020, the neighboring base station may determine a precoding matrix based on information associated with a preferred precoding matrix received from the serving base station. Here, the neighboring base station may determine a precoding matrix using a plurality of codeword matrices included in a codebook.

In operation 1030, the neighboring base station may determine a transmit power based on information associated with a preferred transmit power, that is, a preferred power weight received from the serving base station.

In operation 1040, the neighboring base station may precode at least one data symbol based on the determined phase shift matrix and the precoding matrix. Here, a transmit power of the precoded at least one data symbol may be adjusted according to the determined power weight.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of operating a serving base station for a multi-cell cooperative communication in cooperation with at least one neighboring base station, the method comprising:
generating, using a computer, a precoding matrix based on a plurality of codeword matrices;
providing, using a computer, the phase shift matrix to shift a phase of at least one element among elements included in the precoding matrix; and
precoding, using a computer, at least one data symbol using the phase shift matrix and the precoding matrix, wherein the precoding matrix and the phase shift matrix are based on information from the terminal regarding a preferred precoding matrix and a preferred phase shift matrix adjusting a transmit power of the pre-coded at least one data symbol wherein the adjusting comprises adaptively adjusting the transmit power of the pre-coded at least one data symbol based on at least one of a channel between the at least one neighboring base station and a terminal, a channel between the serving base station and the terminal, and an achievable capacity of the terminal.

2. The method of claim 1, wherein the providing comprises adaptively providing the phase shift matrix based on at least one of a channel between the at least one neighboring base station and a terminal, a channel between the serving base station and the terminal, and an achievable capacity of the terminal.

3. The method of claim 1, wherein the providing comprises generating the phase shift matrix based on an effective channel between the at least one neighboring base station and a terminal or an effective channel between the at least one neighboring base station the serving base station and the terminal with respect to each of the at least one data symbol.

4. The method of claim 1, wherein the providing comprises providing the phase shift matrix using a plurality of candidate matrices pre-stored in a memory.

5. The method of claim 1, further comprising:
receiving, from a terminal, information associated with a preferred phase shift matrix,
wherein the providing comprises providing the phase shift matrix based on information associated with the preferred phase shift matrix.

6. The method of claim 1, wherein the providing comprises providing the phase shift matrix in a form of a diagonal matrix.

7. The method of claim 1, further comprising:
transferring, to the at least one neighboring base station, information associated with the phase shift matrix, information associated with the precoding matrix, or information associated with the transmit power.

8. A method of operating a terminal for a multi-cell cooperative communication through a mutual cooperation between at least one neighboring base station and a servicing base station, the method comprising:
driving a memory storing a plurality of candidate matrices;
generating, using a computer, information associated with a preferred phase shift matrix among the plurality of candidate matrices, the phase shift being used matrix to shift a phase of at least on element among elements included in a precoding matrix, wherein the precoding matrix and the phase shift matrix are based on information from the terminal regarding a preferred precoding matrix and the preferred phase shift matrix;
feeding back, using a computer, to the at least one neighboring base station or the serving base station, information associated with the preferred phase shift matrix and receiving at least one data symbol pre-coded by the pre-coding matrix and the phase shift matrix, wherein transmission power of the at least one data symbol is adaptively adjusted based on at least one of a channel between the at least one neighboring base station and a terminal, a channel between the serving base station and the terminal and an achievable capacity of the terminal.

9. The method of claim 8, wherein the generating comprises generating information associated with the preferred phase shift matrix based on an achievable capacity.

10. The method of claim 8, wherein the generating comprises generating information associated with the preferred phase shift matrix based on an effective channel between the at least one neighboring base station and a terminal or an effective channel between the serving base station and the terminal with respect to each of at least one data symbol that the at least one neighboring base station or the serving base station desires to precode.

11. The method of claim 8, further comprising:
feeding back, to the at least one neighboring base station or the serving base station, information associated with a preferred power weight so that the at least one neighboring base station or the serving base station adjusts a transmit power of at least one data symbol.

12. A serving base station for a multi-cell cooperative communication in cooperation with at least one neighboring base station, the serving base station comprising:
a memory to store a plurality of codeword matrices and a plurality of candidate matrices;
a precoding matrix generator to generate a precoding matrix based on the plurality of codeword matrices stored in the memory;
a phase shift matrix providing unit to provide a phase shift matrix based on the plurality of candidate matrices in order to shift a phase of at least one element among elements included in the precoding matrix; and
a precoder to precode at least one data symbol using the phase shift matrix and a precoding matrix, wherein the precoding matrix and the phase shift matrix are based on information from the terminal regarding a preferred precoding matrix and a preferred phase shift matrix adjusting a transmit power of the pre-coded at least one data symbol wherein the adjusting comprises adaptively adjusting the transmit power of the pre-coded at least one data symbol based on at least one of a channel between the at least one neighboring base station and a terminal, a channel between the serving base station and the terminal, and an achievable capacity of the terminal.

13. The serving base station of claim 12, further comprising:
an information receiver to receive, from a terminal, information associated with a preferred phase shift matrix; and
a power weight adjustment unit to adjust a power weight based on information associated with a preferred power weight, fed back from the terminal, in order to adjust a transmit power of the precoded at least one data symbol, wherein the phase shift matrix providing unit provides the phase shift matrix based on information associated with the preferred phase shift matrix.

14. A terminal for a multi-cell cooperative communication performed through a mutual cooperation between at least one neighboring base station and a serving base station, the terminal comprising:
a memory to store a plurality of codeword matrices and a plurality of candidate matrices that are used to feed back information associated with a preferred precoding matrix;
an information generator to generate information associated with a preferred phase shift matrix among the plurality of candidate matrices, the phase shift being used matrix to shift a phase of at least one element among elements included in a precoding matrix, wherein the precoding matrix and the phase shift matrix are based on information from the terminal regarding the preferred precoding matrix and the preferred phase shift matrix;
an information feedback unit to feed back, to the at least one neighboring base station or the serving base station, information associated with the preferred phase shift matrix and receiving at least one data symbol pre-coded by the pre-coding matrix and the phase shift matrix, wherein transmission power of the at least one data symbol is adaptively adjusted based on at least one of a channel between the at least one neighboring base station and a terminal, a channel between the serving base station and the terminal and an achievable capacity of the terminal.

15. The terminal of claim 14, wherein the information generator comprises a decision unit to determine the preferred phase shift matrix after determining at least one of a number of preferred data symbols and the preferred precoding matrix.

16. A method of operating a neighboring base station for a multi-cell cooperative communication in cooperation with a serving base station, the method comprising:
receiving, using a computer, from the serving base station, information regarding a phase shift matrix and a precoding matrix, wherein the precoding matrix and the phase shift matrix are based on information from the terminal regarding a preferred precoding matrix and a preferred phase shift matrix; and
precoding, using a computer, at least one data symbol that the serving base station desires to transmit using the phase shift matrix and the precoding matrix adjusting a transmit power of the pre-coded at least one data symbol wherein the adjusting comprises adaptively adjusting the transmit power of the pre-coded at least one data symbol based on at least one of a channel between the at least one neighboring base station and a terminal, a channel between the serving base station and the terminal, and an achievable capacity of the terminal.

17. The method of claim 16, further comprising:
extracting the phase shift matrix from a plurality of candidate matrices pre-stored in a memory, based on information associated with the phase shift matrix.

18. The method of claim 16, further comprising:
receiving information associated with a transmit power from the serving base station; and
adjusting a transmit power of the precoded at least one data symbol based on information associated with the transmit power.

* * * * *